(12) United States Patent
Adar et al.

(10) Patent No.: US 6,915,284 B2
(45) Date of Patent: Jul. 5, 2005

(54) SYSTEM AND METHOD FOR AUTOMATED MESSAGE RESPONSE, WITHIN A SYSTEM FOR HARVESTING COMMUNITY KNOWLEDGE

(75) Inventors: Eytan Adar, Palo Alto, CA (US); Rajan Mathew Lukose, Palo Alto, CA (US); Joshua Rogers Tyler, Stanford, CA (US); Caesar Sengupta, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 10/125,829

(22) Filed: Apr. 18, 2002

(65) Prior Publication Data

US 2003/0200190 A1 Oct. 23, 2003

(51) Int. Cl.$^7$ .......................... G06F 17/00; G09B 19/00
(52) U.S. Cl. ........................................ 706/45; 434/118
(58) Field of Search ............................. 706/45; 434/118

(56) References Cited

U.S. PATENT DOCUMENTS 6,581,039 B2 * 6/2003 Marpe et al. .................. 705/7
6,671,693 B1 * 12/2003 Marpe et al. ............... 707/102

OTHER PUBLICATIONS

Pending Patent Application entitled: "System and Method for Harvesting Community Knowledge"U.S. Appl. No. 10/093,658 filed Mar. 7, 2002, inventors Eytan Adar et al.
Webmaster World.com—pp. 1–4 "Google Acquires Outride.com"—Sep. 20, 2001.
www.Google.Com—pp. 1–2—"Google Acquires Technology Assets of Outride Inc."Press Release of Sep. 20, 2001.
Adriana Vivacqua & Henry Lieberman—"Agents to Assist in Finding Help"—2000—pp. 65–72.

(Continued)

*Primary Examiner*—George Davis
(74) *Attorney, Agent, or Firm*—Lloyd E. Dakin, Jr.

(57) ABSTRACT

A system and method for automated message response within a system for knowledge management is disclosed. The method discloses the steps of: identifying a set of information resources; profiling the information resources; monitoring a transmitted message; scoring the monitored message with respect to the information resource profiles; querying an information resource with content from the monitored message, if that information resource's score exceeds a predetermined threshold; receiving a set of query responses from the information resources; generating a response to the monitored message from the query responses; and responding to the monitored message with the message response. The system of the present invention, discloses means for implementing the method.

25 Claims, 6 Drawing Sheets

OTHER PUBLICATIONS

Webpage– Gnutella "http://gnutella.wego.com/"—a widely known peer–to–peer–network.

Webpage—Freenet "http://freenet.sourceforge.net/"—peer–topeer architecture for file sharing.

Mark S. Ackerman & David W. McDonald—"Answer Garden 2: Merging Organizational Memory eith Collaborative Help"—1996—pp. 97–105.

David W. McDonald & Mark S. Ackerman—"Expertise Recommender: A Flexible Recommendation System and Architecture"—Dec. 2000—pp. 231–240.

Leonard N. Foner—"Yenta: A Multi–Agent, Referral–Based Matchmaking System"—1997—pp. 301–307.

Nathaniel S. Borenstein—"Computational Mail as Network Infrastructure for Computer–Supported Cooperative Work"—Nov. 1992—pp. 67–74.

Michael K. Reiter and Aviel D. Rubin—"Crowds: Anonymity for Web Transaction"—pp. 1–23.

Dawit Yimam–Seid & Alfred Kobsa—"Expert Finding Systems for Organizations: Problem and Domain Analysis and the DEMOIR Approach"—pp. 1–23.

www.Mercado.com—pp. 1–3 "Outride Unveils Mission: Make Internet, Corporate Intrane More Relevant, Personal—Announces Relationships with Excite@home, Inktomi & Mercado Software"—Press Release of Dec. 5, 2000.

www.thestreet.com—pp. 1–2—"Xerox Pushes GroupFire Out of the Start–Up Incubator"—Tish Williams—Sep. 19, 2000.

www.nwfusion.com—pp. 1–2—Xerox Spinoff Touts Service for Better Web—Jan. 31, 2000 Carolyn Duffy Marsan.

Webpage—The Crowds research project at AT&T Labs— "http://www.research.att.com/projects/crowds/"—creates anonymous web transactions by routing requests through a peer–to–peer network in a randomized way.

Expert–finding systems (such as www.exp.com, www.keen.com) —enable individuls to find experts to answer questions.

* cited by examiner

SYSTEM AND METHOD FOR AUTOMATED MESSAGE RESPONSE, WITHIN A SYSTEM FOR HARVESTING COMMUNITY KNOWLEDGE

CROSS-REFERENCE TO CO-PENDING APPLICATIONS

This application relates to and incorporates by reference co-pending U.S. patent application Ser. No. 10/093,658, entitled "SYSTEM AND METHOD FOR HARVESTING COMMUNITY KNOWLEDGE," filed on Mar. 7, 2002, by Adar et. al. This related application is assigned to Hewlett-Packard Co. of Palo Alto, Calif.

BACKGROUND OF THE INVENTION

1. Field of the Invention

The present invention relates generally to systems and methods for information sharing and knowledge management, and more particularly for server augmented harvesting community knowledge.

2. Discussion of Background Art

Satisfying information needs in a diverse, heterogeneous information environment is challenging. In order to even begin the process of finding information resources or answers to questions, individuals typically must know either where to look, or whom to ask. This is often a daunting task, especially in large enterprises where many of the members will not know each other, nor be aware of all the information resources potentially at their disposal.

Current systems for storing information and/or organizational expertise include Knowledge Databases (K-bases), such as document repositories and corporate directories, as well as Knowledge Management systems, which rely on users to explicitly describe their personal information, knowledge, and expertise to a centralized K-base.

Figure 1:
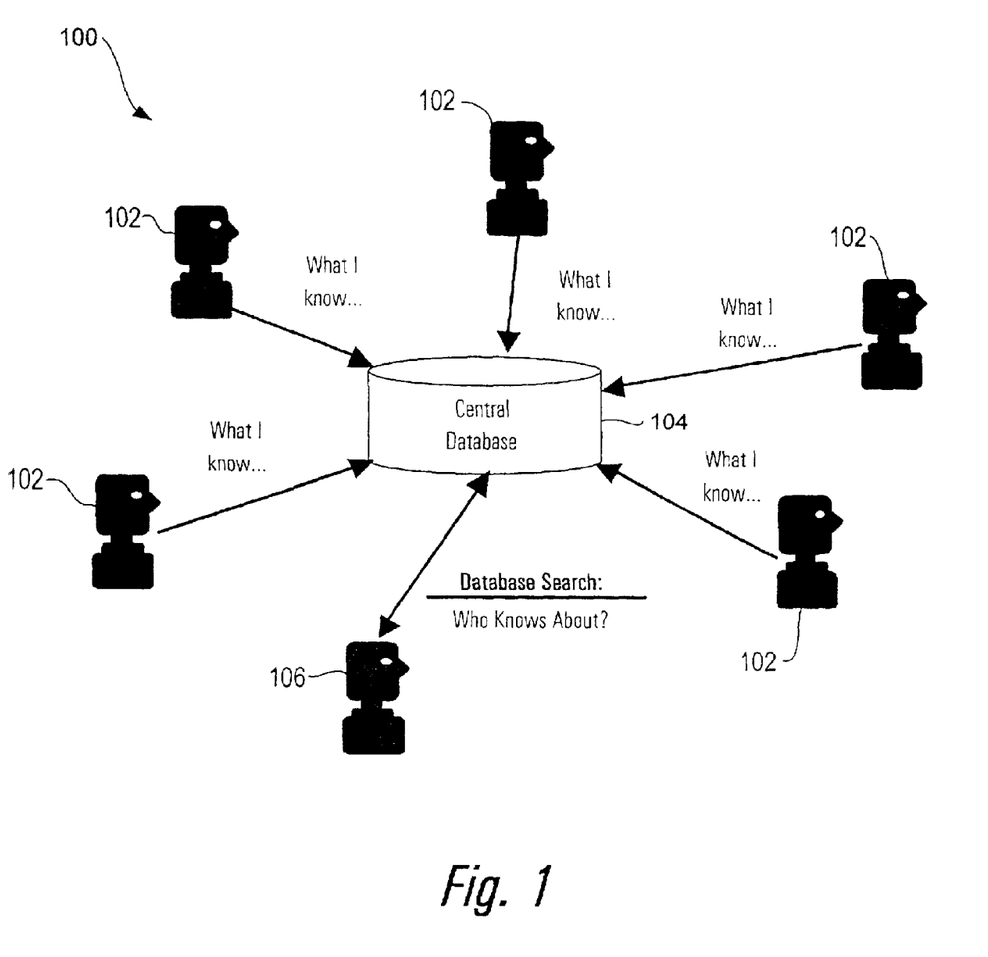
FIG. 1 is a dataflow diagram of a conventional system for knowledge management.

FIG. 1 is a dataflow diagram of a conventional knowledge management system 100. In a typical architecture, information providing users 102 explicitly decide what descriptive information they provide to a central database 104. An information seeking user 106 then performs a query on the central database 104 in order to find an information provider who perhaps may be able to answer the seeker's question.

There are several problems with such systems. First, knowledge management systems, like that shown in FIG. 1, require that information providers spend a significant amount of time and effort entering and updating their personal information on the central database 104. For this reasons alone, such systems tend to have very low participation rates. Second, even those information providers, who take time to enter and update this information, may misrepresent their personal information or level of knowledge and expertise be it willfully or not. Furthermore, they may neglect or be unable to reveal much of their tacit knowledge within their personal description. Tacit knowledge is knowledge a user possesses, but which the user either does not consider important enough to enter, or which they may not even be consciously aware that they know.

Because of the inaccuracy and/or incompleteness of such personal information, information seekers, even after all of their searching efforts, may still find their questions left unanswered, perhaps because the "expert" they identified may not have the bandwidth to respond. Similarly, even information seekers who discover the existence of relevant K-bases may be required to formulate queries which are so complex that they either can not or will not bother to perform a proper search.

Other problems with such systems, are their lack of anonymity and excessive cost. Such systems do not enable the information seekers and providers to remain anonymous while performing queries or asking questions. As such, they may not perform a search, as a question, or wholeheartedly reveal their knowledge about a particular topic in their response to another user's question. Also, such conventional centralized systems require the installation of additional costly hardware dedicated to the knowledge management system, and do not make use of otherwise underutilized resources such as the user's own personal computer.

In response to the concerns discussed above, what is needed is a system and method for harvesting community knowledge that overcomes the problems of the prior art.

SUMMARY OF THE INVENTION

The present invention is a system and method for automated message response within a system for knowledge management. The method includes the steps of: identifying a set of information resources; profiling the information resources; monitoring a transmitted message; scoring the monitored message with respect to the information resource profiles; querying an information resource with content from the monitored message, if that information resource's score exceeds a predetermined threshold; receiving a set of query responses from the information resources; generating a response to the monitored message from the query responses; and responding to the monitored message with the message response.

The system of the present invention, includes means for implementing the method.

These and other aspects of the invention will be recognized by those skilled in the art upon review of the detailed description, drawings, and claims set forth below.

DETAILED DESCRIPTION OF THE PREFERRED EMBODIMENT

The present invention provides a mechanism for improving the responsiveness of a system for providing information to and harvesting information from a community of users and information resources through the use of one or more robot servers.

Figure 2:
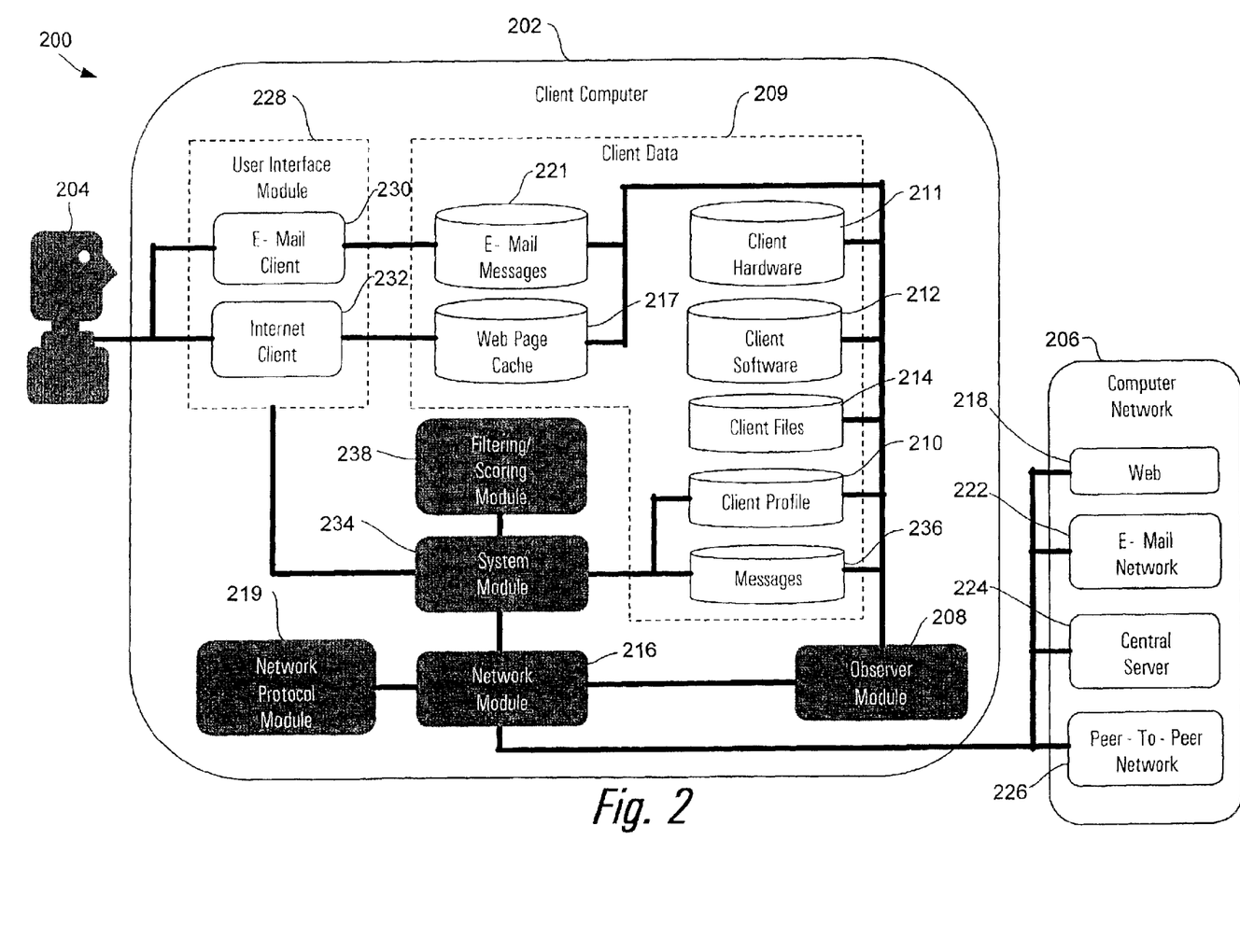
FIG. 2 is a dataflow diagram of one embodiment of a system for harvesting of community knowledge.
Figure 3:
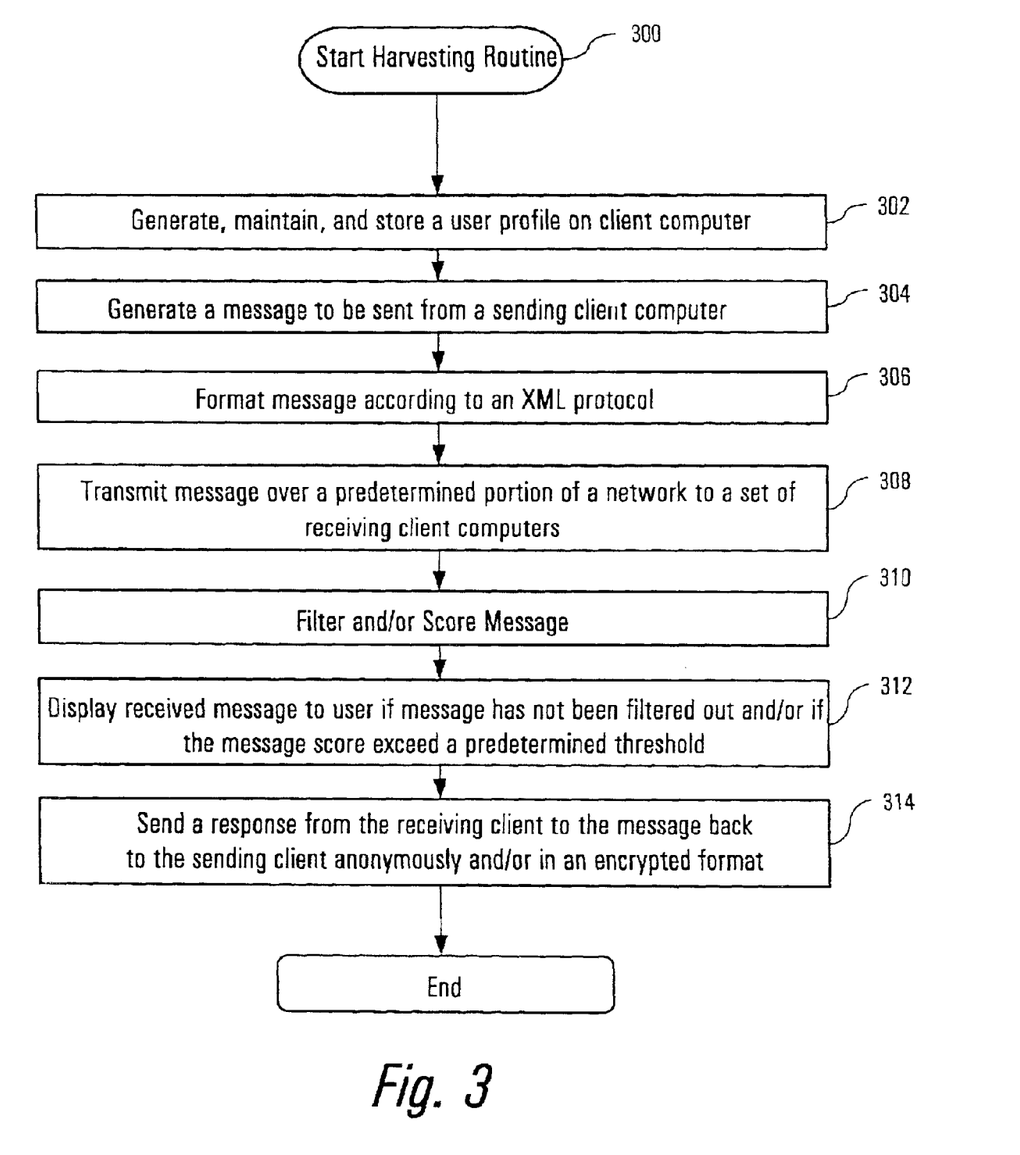
FIG. 3 is a flowchart of one embodiment of a method for harvesting of community knowledge.

FIG. 2 is a dataflow diagram of one embodiment of a system 200 for harvesting community knowledge. FIG. 3 is a flowchart of one embodiment of a method 300 for harvesting community knowledge. FIGS. 2 and 3 are herein discussed together. The system 200 includes a client computer 202 under the control of a user 204, and connected to a computer network 206. The client 202 both sends and receives messages respectively to and from other client computers and information sources via the network 206. When a client computer generates and sends a message such client computer is herein alternately called a sending client, and when a client computer receives a message, such client computer is herein alternately called a receiving client. Preferably all client computers on the network include the same functionality, which is now described with respect to the client computer 202, however some receiving clients may not currently have the present invention's software installed.

User Profiling

The method 300 begins with an observer module 208 generating and maintaining a client profile 210 on the client computer 202, in step 302. The observer module 208 begins a process of generating and maintaining the client profile 210 by monitoring and collecting data with respect to both internal and external computer 202 information and operations. Internal data includes: user 204 behavior on the computer 202, installed client hardware 211, installed client software 212, and locally stored client files 214. External data includes: a web page cache 217 populated through internet client 232 interactions with world wide web 218 sites, and e-mail messages 221 populated through e-mail client 230 interactions with an e-mail network 222. User operations, in addition to the term's normal meaning, is herein defined to include together or in the alternative: user behavior on the client computer 202; any information about the user; any information about the client computer 202; and/or any information about the computer's 202 interaction with the network 206.

During the monitoring process, selected data is captured, processed, and added to the client profile 210. The selected data is then automatically analyzed and formatted for storage in the client profile 210. Thus, the observer module 208 relieves the user 204 from having to manually describe themselves to other users on the network 206. This dramatically reduces the participation costs for all users of the present invention, while ensuring that the client profile 210 is constantly kept up to date. Thus the client profile 206, as generated and maintained by the present invention, serves as a very rich and detailed data structure for enabling the user 204 to efficiently and equitably participate in an information market.

In order to maximize the user's 204 privacy and thereby encourage broad user participation within the information market, the client profile 210 is preferably stored only on the client computer 202, however the profile 210 may also be stored remotely either in encrypted or password protected form and viewable only by the user 204. Also to toward this goal, the user 204 is also preferably given an option of erasing their client profile 210, or having the observer 208 rebuild a new client profile for the user 204.

Message Generation

Next to be described is a system and method for generating messages in step 304 using the present invention. Messages are herein defined to include a wide variety of communications known to those skilled in the art, including any communication seeking, sending, and/or culling information from an information market. Thus messages can include questions, announcements, and/or information processing routines.

To begin, the user 204 accesses a user interface module 228. The user interface module 228 preferably includes a set of software modules for interfacing with the user 204. Such modules at a minimum include the e-mail client 230, which stores a predetermined set of e-mail messages 221, and the Internet client 232, which stores information in the web page cache 217. These two modules 230 and 232 provide the user 204 with alternate ways of using the present invention and preferably, both contain similar functionality, such as text windows and folders for storing messages both sent and received.

Through the user interface module 228, the user 204 initiates the message, generating process, such as by clicking on an "Ask a Question" button in a toolbar within the user interface. In response, the user interface module 228 displays a number of pre-defined message types to the user 204.

One message type example is a "Find an Expert" message. The find an expert message is likely to be one of the more popular questions asked by the user 204. The find an expert message includes a message field, an anonymous check box, and an optional filters field. The message field collects information provided by the user 204 which the user believes will help the present invention direct the message to receiving clients likely to be able to either answer the user's 204 question or be apprised of the user's 204 interest in some knowledge area and inviting further communication. The more detail the user 204 provides in the message field, the better directed will be the message to an appropriate set of receiving clients. The anonymous check box, if checked, directs the message to be sent only over a peer-to-peer network 226, using randomization, without any information explicitly identifying the user's identity. Users of the present invention are expected to direct a large amount of message traffic over the peer-to-peer network 226 in order to maintain their anonymity. The optional filters field permits the user 204 to target the message to a set of receiving clients satisfying one or more filtering conditions.

The network module 216 periodically scans the message database 236 for new messages generated by the user 204. Then in step 306, a network protocol module 219 formats the new message according to an XML (Extensible Markup Language) protocol for transmission by the network module 216 over the network 206. Both a client computer sending the message and a client computer receiving the message must be apprised of the particular XML protocol used to format the message, in order for communication to occur.

Preferably the peer-to-peer network 226 is limited to an enterprise's intranet so that only a predetermined set of client computers on the network 206 may have an opportunity to respond to the message. By limiting the scope of users allowed to see messages, a baseline level of confidentiality, expertise, and/or message response integrity may be maintained. For instance, the scope of users may be limited to only those who are employed within a particular enterprise, who belong to a particular professional society, or who are students and one or more universities. The exact scope of users will thus depend upon a particular application of the present invention.

In alternate embodiments, messages may be transmitted over global e-mail and/or web networks, but in an encrypted format which again limits the scope of users. In other embodiments, there may be no limits on the scope of users who may be given an opportunity to respond to the messages.

Message Transmission

Next in step 308, the network module 216 transmits the message over a predetermined portion of the computer network 206. As will be discussed below, messages transmitted over the peer-to-peer network 226 achieve a high level of anonymity, however many messages will likely be transmitted over the e-mail network 222 or displayed on a web 218 site in order to advertise the present invention and thereby build-up the peer-to-peer network 226.

As mentioned above, when the computer client 202 transmits a message over the network 206 it is called a sending client, while when the computer client 202 receives a message over the network 206 it is called a receiving client. Thus in normal operation, all client computers function as both sending and receiving clients.

The present invention thus encourages a high level of participation and sharing of expertise by permitting users to maintain privacy and anonymity. User privacy is preserved by storing the user's 204 client profile 210 preferably only on the client computer 202 thereby encouraging users to permit the building of very rich profiles which go far beyond those users would otherwise voluntarily disclose to a central database. User anonymity is preserved by transmitting messages over the peer-to-peer network 226.

Figure 4:
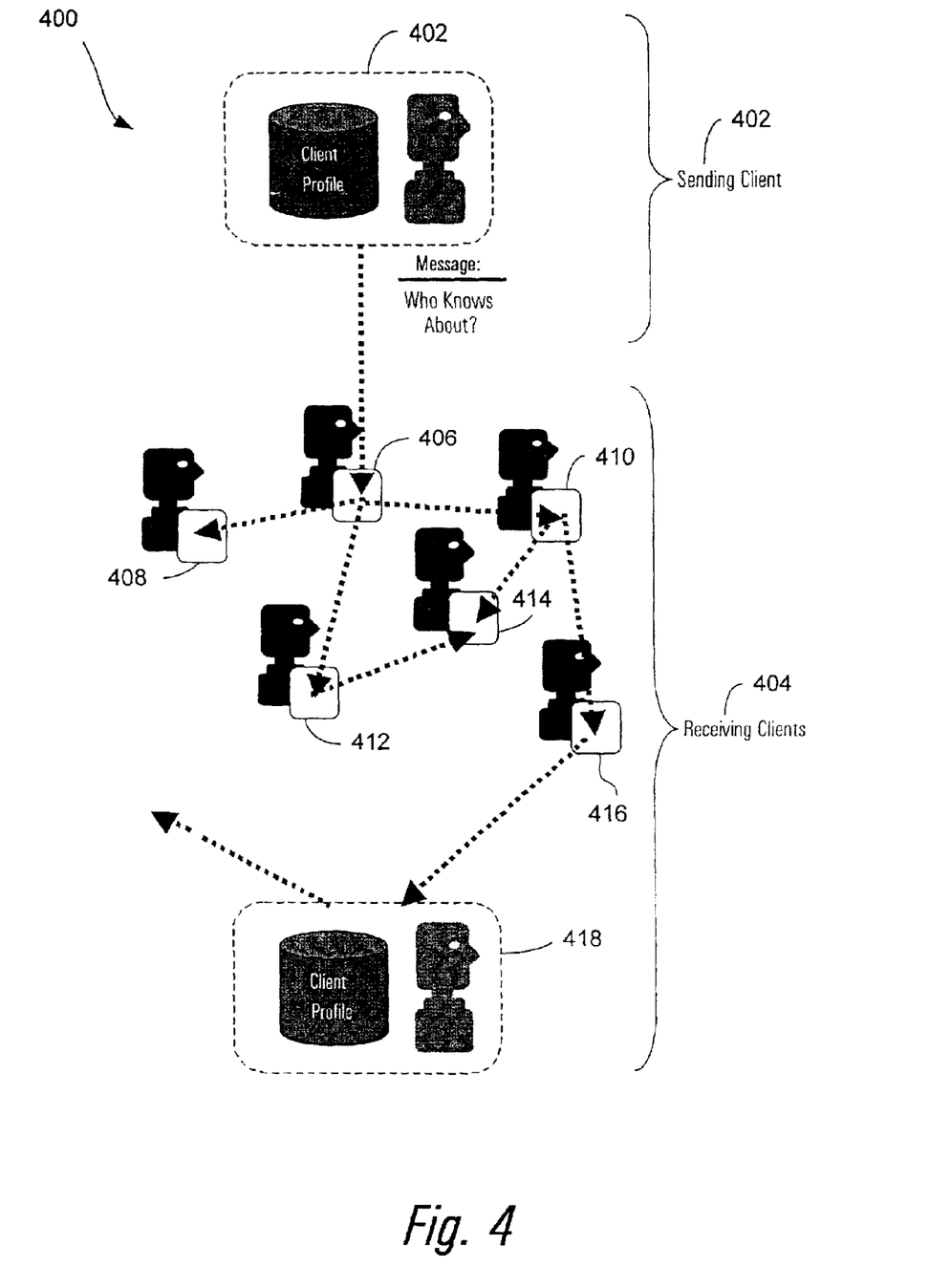
FIG. 4 is a dataflow diagram of one embodiment of a portion of a peer-to-peer network for connecting clients within the system.

FIG. 4 is a dataflow diagram of one embodiment of a portion of a peer-to-peer network 400 for connecting clients within the system 200. The network 400 includes a sending client 402 and a set of receiving clients 404. The peer-to-peer network is created when the sending client 402 accesses a list of other client computers known to be configured for peer-to-peer communication. In order to expand upon this list and discover additional peers who may be available on the network 226, the sending client 402 can also ask its known peers, such as receiving client 406, for that peer's list of other client computers.

The sending client 402 randomly selects from this list and establishes connections according to a predetermined protocol. In the embodiment shown, the sending client 402 has connected to receiving client 406. Similarly, the receiving client 406 has connected to receiving clients 408, 410, and 412 and so on.

In peer-to-peer networks, when a message is sent out each peer that receives the message forwards it to its known neighboring peers, except in the cases that it has been already transmitted to that peer. The topology is random and depends on which peers each client is currently actively connected to. This randomization is the mechanism which creates anonymity for all of the peers, since when a peer receives a message, that peer cannot be sure if the client computer from which it received the message originated the message.

The number of peers to which the message is exposed can be varied depending upon how the present invention is implemented. In one embodiment, all active peers can be sent every question. In another embodiment, the message may only be sent to a horizon line of the sending peer. Preferably, each message can be forwarded only a predetermined number of times before it is dropped. This could be implemented by adding a time-to-live (TTL) parameter to each sent message which indicates the number of hops the message can take. After each hop, the TTL is decremented by one so that when the TTL reaches zero, the last receiving client will no longer forward the message on to other clients. Those skilled in the art will know of other embodiments for transmitting the message over networks.

In the embodiment shown, the message is broadcast from the sending client 402 to a first tier of receiving clients, which includes receiving client 406 as well as others which are not shown. The message is then broadcast from the receiving client 406 to a second tier of receiving clients, which includes receiving clients 408, 410, and 412 as well as others which are not shown. The message is then again broadcast from the receiving clients 408, 410, 412 to a third tier of receiving clients, which includes receiving clients 414, and 416. Continuing, receiving client 416, as well as others in the third tier, broadcasts the message to a fourth tier of receiving clients, including receiving client 418, and so on and on. As can be deduced from this brief description, the message is transmitted so many times by so many different peers that a high level of anonymity is assured.

Each receiving client receives the message through their respective network modules, like network module 216. System modules within the receiving clients, like system module 234, store the message in their respective messages database, like messages database 236. Due to normal peer-to-peer network 226 topology, should said receiving clients receive the message again, their respective system modules will check their message databases for a copy of the message. If said copy exists, the system modules will prevent their network modules from sending out the message again. This eliminates excessive message traffic over the network 206.

Message Filtering and Scoring

For purpose of the discussion to follow, functionality within the client computer 202 for processing received messages is discussed as if the client computer 202 was one of the receiving client computers. Such a context switch is appropriate because preferably each client computer contains a complete and self contained version of the present invention's software.

Thus in step 310, the system module 234 within the client computer 202 retrieves, and commands a filtering/scoring module 238 to filter and score, newly received messages which have been stored in the messages database 236.

In order to perform filtering and scoring, the filtering/scoring module 238 compares the message with information stored in the user's 204 client profile 210. If necessary however, the message may be compared with data stored elsewhere in the client computer 202, such as in the e-mail client 230, the e-mail messages 221, the internet client 232, the web page cache 217, the client software 212, the client files 214, and the client messages 236.

A received message is filtered by the filtering/scoring module 238 when such message contains a predetermined set of criteria, inserted by the message sending client, in order to target selected receiving clients. Such filtering criteria is preferably very flexible and is left at the discretion of the sending client user. For example, the filtering criteria may look for a particular data string, or at some other information within a receiving client's client profile 210.

In an alternate embodiment however, a client profile 210 which does not meet the filtering criteria merely results in a low message score. In this way, a message which does not meet the filtering criteria does not automatically prevent the user 204 from seeing the message. In such embodiments an overall weighted average score may be generated which depends upon not only all of the filtering criteria, but also the message's score. How the message's score is generated is discussed next.

The filtering/scoring module 238 preferably scores messages using statistical information retrieval techniques, including linguistic analysis. Information retrieval techniques are commonly known to be used for accessing and analyzing large blocks of data and then extracting all or selected portions of such data according to a wide variety of methods. Other techniques are also known to those skilled in the art.

Thus the filtering and scoring techniques of the present invention in combination with the rich client profiles stored on each receiving client's computer are together what enable messages to be brought to the attention of the right set of users.

Such intelligently targeted messaging, however, also builds user confidence in and reliance on the present invention. This is because unlike in conventional systems where users often have to wade though in-boxes full of junk or marginally useful e-mail, users using the present invention generally know and rely on the fact that their time will not be wasted on such unimportant messages. Instead users of the present invention will be even more likely to timely respond to messages received because the messages will be so on-point to their expertise and/or interests.

Message Display and Response

In step 312, the received message is displayed to the receiving client if the message has not been filtered out and/or if the message score exceeds a predetermined threshold. Messages are preferably displayed to the receiving client according to their respective score. As discussed above, the score represents a likelihood that the receiving client will find the message relevant to or within their expertise.

The receiving client then may select and respond to one of the messages. In step 314 a response from the receiving client is sent over the network 206 back to the sending client anonymously or in an encrypted format. After step 314 the preferred method ends.

Automated Response Generation

Messages transmitted over the peer-to-peer network 226 do not always receive responses that are either highly relevant nor within a reasonable time period, even when those messages are routed to those receiving clients best able to provide relevant responses. This is often because some receiving clients may not have ready access to a relevant set of information resources from which a relevant response can be generated, and/or because said receiving clients are very busy with their current projects. One solution to this problem, using automated response techniques, is now provided.

The automated message response techniques described in this specification can be effected in either a sole client mode or a global network mode. The sole client mode refers to when automated message responses are harvested only from information resources located on a particular client computer. Such particular client computer can either be the client computer whose user has originated the transmitted message, or one or more of those client computers who have received the transmitted message. In this latter instantiation, those client computers receiving the message preferably would not generate completely automated responses. Instead, responses would preferably be "suggested" by the present invention to the users of the receiving computers, who would then decide whether such suggested responses be sent to the client computer whose sent the message.

The global network mode refers to when automated message responses are harvested from information resources located anywhere on the computer network 206. Both modes can operate simultaneously. Any distinctions between these two different modes are clarified as appropriate in the discussion below.

Figure 5:
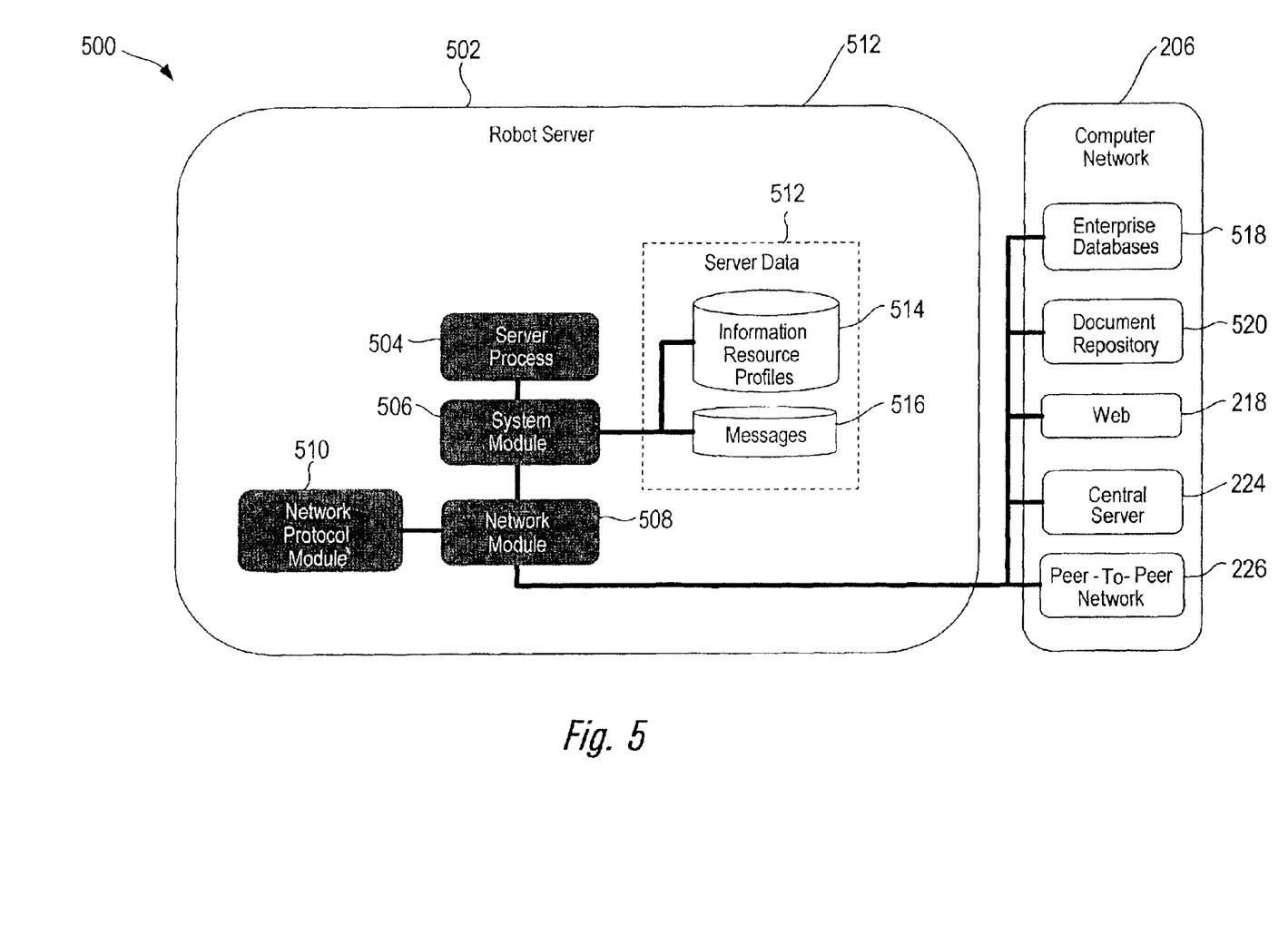
FIG. 5 is a dataflow diagram of one embodiment of a robot server for automated message response.
Figure 6:
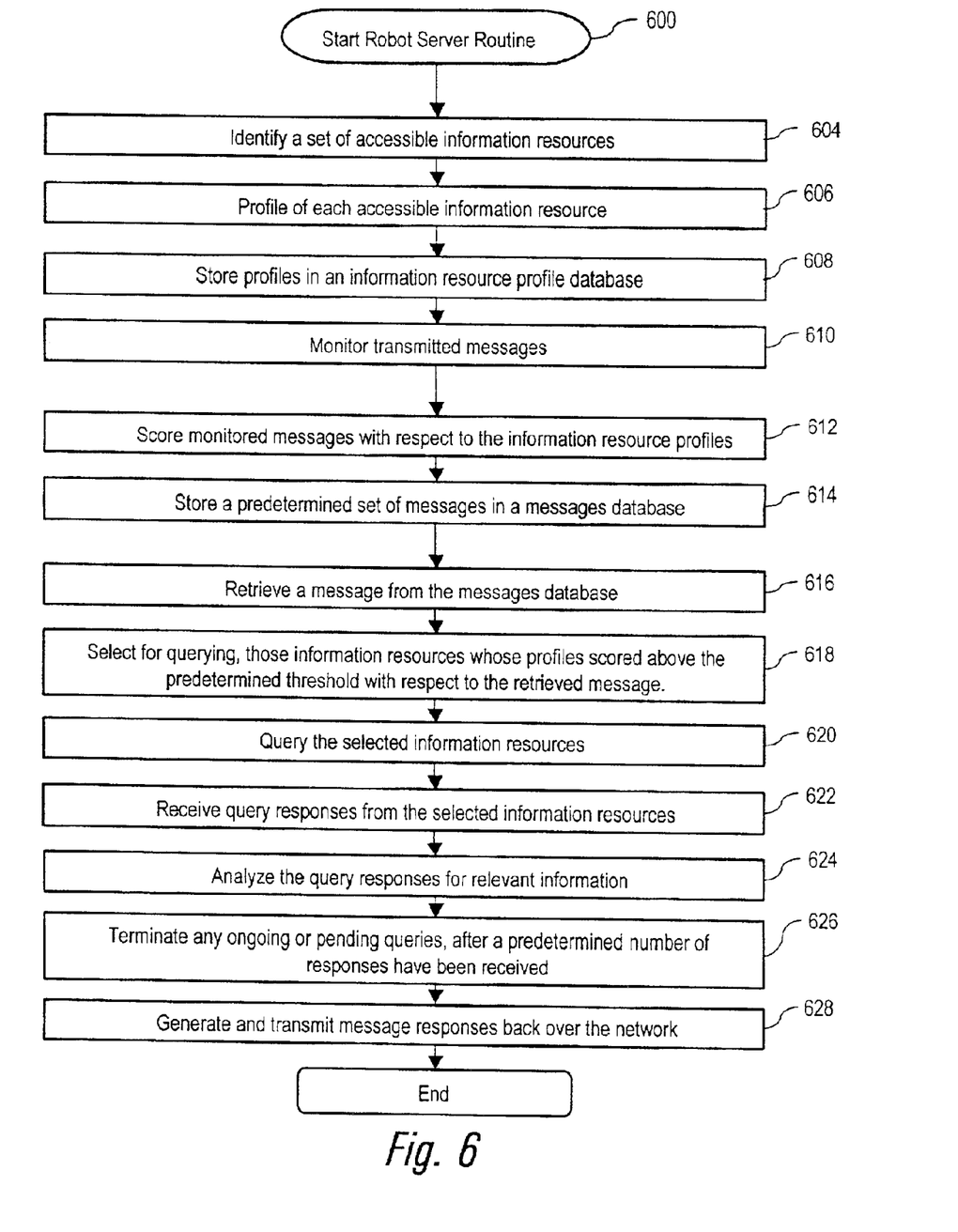
FIG. 6 is a flowchart of one embodiment of a method for automated message response within the system.

FIG. 5 is a dataflow diagram 500 of one embodiment of a robot server 502 which supports the global network mode of the present invention, and FIG. 6 is a flowchart of one embodiment of a method 600 for automated message response, which supports either the sole client or global network modes. FIGS. 5 and 6 are herein discussed together. FIG. 5 shows the robot server 502. The robot server 502 can either be a dedicated network server, or can be one of the client computers on the network 226 which has been nominated and configured for global network benefit. Preferably only client computers having superior processing power and storage capability are so nominated.

In global network implementations of the present invention, the robot server 502 preferably includes: a server process 504, a system module 506, a network module 508, a network protocol module 510, and server data 512. The server data 512 includes an information resource profile database 514 and a messages database 516. The robot server 502 is also connected to the network 206, which contains a variety of information resources. In the sole client mode, the client computer 202 preferably also includes the information resource profile database 514 and the system module 234 contains necessary functionality from the server process 504.

While FIG. 5 shows only one robot server 502, the present invention is equally functional when the peer-to-peer network 226 is supported by multiple robot servers, having similar functionality. Such multiple servers enhance the present invention by providing network fault tolerance, and increased network performance over geographically diverse networks. In the case where there are multiple servers on the network 226, the servers preferably mirror each other in order to provide such fault tolerance, and clients attempting to post messages to an overloaded server are preferably referred to another, less utilized server. The location of all servers on the network 226 is preferably globally known to all of the client computers.

The method 600 begins in step 604, where a set of accessible information resources are identified. In the global network mode, the set of accessible information resources includes at a minimum the computer network 206 resources shown in FIG. 5, which include the world wide web 218, the central server 224, the peer-to-peer network 226, a set of enterprise databases 518, a document repository 520, and a variety of other Knowledge-bases (K-bases), search engines, and expert finding systems, which are not shown. These information resources are preferably either preprogrammed into the robot server 502 by a systems administrator, or identified automatically by the server process 504. In the sole client mode, the set of accessible information resources preferably includes at a minimum the client data 209, shown in FIG. 2.

In step 606, an information resource profile is created for each accessible information resource. The information resource profiles characterize an information resource's information stores, and/or search capabilities. Some embodiments of the present invention may profile information resources using the same techniques discussed with regard to building the client profile 210. These include, linguistic analysis, statistical procedures, and identifying pre-defined variables or other meta-data which describes the information resources. Other embodiments of the present invention, however, may profile information resources in simpler ways, such as by caching a few of the information resource's keywords. However in the sole client mode, the client computer 202 preferably does not re-profile the client profile 210 within the client data 209. In step 608, the information resource profiles are stored in the information resource profile database 514.

Next, in step 610, messages transmitted are monitored. In the global network mode, the robot server 502 monitors messages transmitted over the network 226 between each of the client computers. In the sole client mode, the client computer 202 however preferably monitors only its own messages. Next, in step 612, the monitored messages are scored with respect to each of the information resource profiles using the techniques described within the Message Filtering and Scoring section of this specification. In a case where some of the information resource profiles are in a foreign language, the monitored messages are translated into that foreign languages, so that scoring is effected properly.

In step 614, a predetermined set of messages are stored in the messages database. In the global network mode, the messages are stored in messages database 516, however in the sole client mode, the messages are stored in messages database 236.

If the present invention configured to implement a Previously Asked Questions search capability, then preferably the messages databases 236 and 516 retain a large number of monitored messages. Previously Asked Questions search capabilities can improve the present invention's efficiency, since responses to new messages can be automatically generated by recycling the previous message responses to old messages which are stored in the messages database, if the new and old messages are sufficiently similar. Sufficient similarity is herein defined as when a score comparing the old and new messages exceeds a predetermined threshold. In order to effectively implement the Previously Asked Questions functionality, however, a larger capacity messages database is preferred.

If the Previously Asked Questions functionality is not implemented, a smaller number messages are preferably retained in the messages database 516. In such an implementation, the robot server 502 preferably retains only those messages which score above a predetermined threshold when compared with one or more of the information resource profiles 514. Messages which score below the predetermined threshold with respect to all of the information resource profiles 514 are not likely to yield relevant responses from such information resources and are thus not preferably retained.

In step 616, a message is retrieved from the messages database 516. In step 618, those information resources whose profiles scored above the predetermined threshold with respect to the retrieved message are selected for querying. It is these information resources which are likely to contain, or support formulation of, a relevant responses to the retrieved message.

In an alternate embodiment of the present invention, however, the information resources selected in step 618 are sorted by their score, and only the top "n" scoring information resources are finally selected ("n" is an integer). In another alternate embodiment, the profiling and scoring steps are skipped, and all information resources are instead selected for querying.

In step 620, each of the selected information resources are queried. Queries sent to each selected information resource may have a variety of forms. In one example, the query contains key-strings, defined herein as including keywords and/or key-phrases extracted from the retrieved message. Key-strings may also include any portion of a message, up to and including the entire message. In another embodiment, filters within the monitored message are used to help formulate the query. The information resources are preferably queried in order of their score with respect to the retrieved message (i.e. information resources which scored highest are queried first, those which scored second highest are queried next, and so on).

In step 622, query responses are received from the selected information resources. In an alternate embodiment of the present invention, a predetermined time window is set for receiving query responses from the information resources, after which no more query responses are accepted.

Next in step 624, each of the query responses are analyzed, in the order received, for information relevant to the retrieved message. In a first embodiment of step 624, each query response is scored with respect to the sending client's message, using techniques similar those described with respect to the filtering/scoring module 238 above. In a second embodiment of step 624, information within a query response is deemed relevant if one or more keywords or key-phrases in the sending client's message are also present in the query response. In a third embodiment applicable to the sole client mode, the query responses are presented to the user of the client computer as a set of "suggested responses" which the user can then either accept or reject. In a fourth embodiment applicable to the global network mode, the query responses identified are sent to their original authors who can either "ok," add comments to, or "not-ok" these "suggested" responses. In a fifth embodiment of the present invention, step 624 is skipped entirely and all query responses received are automatically deemed relevant. Those skilled in the art will recognize that responses may also be scored/ranked according to other standard metrics, such as "popularity" or "usage" ranking.

In step 626, after a predetermined number of responses have been received, any ongoing or pending queries are terminated. The predetermined number of responses is preferably a fixed number, which may or may not be based on a criteria such as counting a response toward the predetermined number only if the response's score exceeds a predetermined threshold.

In step 628, those query responses which are relevant to the retrieved message are, in the global network mode, serially transmitted back over the network 226. In the sole client mode, the query responses are serially transmitted back to the user 204. In alternate embodiments, the query responses are aggregated into a single summary response. After step 626 the preferred method 600 ends.

By automatically responding to selected messages using potentially untapped information resources, the present invention enhances the quality and timeliness of message responses, which is especially useful when other clients on the network 226 either are not able to or do not have the time to promptly respond.

Processing Information From Other Sources Using the Present Invention

While the present invention has been discussed with respect to the generation, transmission and response to messages, the present inventions' user profiling and scoring functionality is equally applicable toward processing other types of information as well. Other information includes data displayed within a current web page being viewed by the user 204. A relevance vector could be generated from said web page data and compared to the user's 204 expertise vector generated from the client profile 210. User's would be notified of a particular relevance of the currently viewed web page if the relevance and expertise vectors when compared yield a score which exceeds a predetermined threshold. In this way user's browsing the web could be apprised of particular web pages which may closely align with their interests and/or expertise.

Other information similarly processed and scored may include: normal e-mail messages which have not been generated using the present inventions' functionality; files downloaded from the central server 224 or received from some other source; or expertise information stored on a central enterprise database. Those skilled in the art will know of other information sources to which the present invention may also be successfully applied.

While one or more embodiments of the present invention have been described, those skilled in the art will recognize that various modifications may be made. Variations upon and modifications to these embodiments are provided by the present invention, which is limited only by the following claims.

What is claimed is:

1. A method for knowledge management, comprising:

identifying a set of information resources;

profiling the information resources;

monitoring a transmitted message;

scoring the monitored message with respect to the information resource profiles;

querying an information resource with content from the monitored message, if that information resource's score exceeds a predetermined threshold;

receiving a set of query responses from the information resources;

generating a response to the monitored message from the query responses; and responding to the monitored message with the message response.

2. The method of claim 1:

wherein the querying element includes, serially querying the information resources, in order of their score.

3. The method of claim 1:

wherein the querying element includes, querying a fixed number of top scoring information resources.

4. The method of claim 1:

wherein the querying element includes, translating the querying content into a language in which the information resource is written.

5. The method of claim 1:

wherein the querying element includes, querying with key-strings from the monitored message.

6. The method of claim 1:

wherein the querying element includes, querying with keywords from the monitored message.

7. The method of claim 1:

wherein the querying element includes, querying with filters from the monitored message.

8. The method of claim 1:

wherein the receiving element includes, terminating the query after a predetermined number of query responses have been received.

9. The method of claim 1:

wherein the generating element includes, analyzing the query responses for information relevant to the monitored message.

10. The method of claim 1:

wherein the identifying element includes, identifying information resources on a peer-to-peer network.

11. The method of claim 1:

wherein the identifying element includes, identifying a K-base.

12. The method of claim 1:

wherein the identifying element includes, identifying a search engine.

13. The method of claim 1:

wherein the identifying element includes, identifying an expert finding system.

14. The method of claim 1:

wherein the monitoring element includes, monitoring a message transmitted over a peer-to-peer network.

15. The method of claim 1:

wherein the generating element includes, sending the query responses to their original authors for comments.

16. The method of claim 1, further comprising:

effecting all claim 1 elements with a dedicated network server.

17. The method of claim 1, further comprising:

effecting all claim 1 elements with a client computer on a peer-to-peer network.

18. The method of claim 1, further comprising:

effecting all claim 1 elements with multiple servers.

19. The method of claim 1:

wherein the identifying element includes, identifying information resources only on a client computer.

20. The method of claim 1:

wherein the identifying element includes, identifying client data on the client computer.

21. The method of claim 1:

wherein the identifying element includes, identifying a client profile on the client computer.

22. The method of claim 1:

wherein the monitoring element includes, monitoring only a client computer's message.

23. The method of claim 1, wherein the generating element includes:

presenting the query responses as suggestions; and requesting approval of the suggested query responses.

24. The method of claim 1:

wherein the identifying element includes, identifying a set of previously transmitted messages; and wherein the scoring element includes, scoring the monitored message with respect to the previously transmitted messages; and wherein the generating element includes, generating the response from previous responses to the previously transmitted messages.

25. A system for knowledge management, comprising:

means for identifying a set of information resources;

means for profiling the information resources;

means for monitoring a transmitted message;

means for scoring the monitored message with respect to the information resource profiles;

means for querying an information resource with content from the monitored message, if that information resource's score exceeds a predetermined threshold;

means for receiving a set of query responses from the information resources;

means for generating a response to the monitored message from the query responses; and means for responding to the monitored message with the message response.

* * * * *